(12) United States Patent
Hashimoto

(10) Patent No.: US 8,634,100 B2
(45) Date of Patent: Jan. 21, 2014

(54) IMAGE FORMING APPARATUS FOR DETECTING INDEX DATA OF DOCUMENT DATA, AND CONTROL METHOD AND PROGRAM PRODUCT FOR THE SAME

(75) Inventor: Yasuhiro Hashimoto, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1037 days.

(21) Appl. No.: 11/484,616

(22) Filed: Jul. 12, 2006

(65) Prior Publication Data

US 2007/0242282 A1    Oct. 18, 2007

(30) Foreign Application Priority Data

Apr. 18, 2006  (JP) .................................. 2006-114797

(51) Int. Cl.
*G06K 15/00*  (2006.01)

(52) U.S. Cl.
USPC ........................................ 358/1.18; 358/1.15

(58) Field of Classification Search
USPC ................................. 358/1.1–1.16
See application file for complete search history.

(56) References Cited

U.S. PATENT DOCUMENTS

| | | | |
|---|---|---|---|
| 6,934,046 B1 * | 8/2005 | Nishikawa et al. | 358/1.15 |
| 2001/0043346 A1 | 11/2001 | Roztocil et al. | |
| 2003/0053133 A1 * | 3/2003 | Nakagiri et al. | 358/1.18 |
| 2003/0056176 A1 * | 3/2003 | Tanaka et al. | 715/522 |
| 2005/0008387 A1 * | 1/2005 | Sato | 399/81 |
| 2005/0111035 A1 * | 5/2005 | Takamine | 358/1.15 |
| 2005/0264848 A1 * | 12/2005 | Suzuki | 358/1.18 |
| 2006/0152758 A1 * | 7/2006 | Owen | 358/1.15 |
| 2006/0238810 A1 | 10/2006 | Fukudome | |
| 2007/0219773 A1 * | 9/2007 | Roux et al. | 704/1 |

FOREIGN PATENT DOCUMENTS

| | | |
|---|---|---|
| JP | 06-064241 | 3/1994 |
| JP | 2000-181905 | 6/2000 |
| JP | 2001-080142 | 3/2001 |
| JP | 2001-309116 | 11/2001 |
| JP | 2002-137499 | 5/2002 |
| JP | 2003-005944 | 1/2003 |
| JP | 2003-162520 A | 6/2003 |
| JP | 2005-119095 | 5/2005 |
| JP | 2005-182519 | 7/2005 |
| JP | 2005-324526 | 11/2005 |
| JP | 2006-301927 | 11/2006 |

* cited by examiner

*Primary Examiner* — Benny Q Tieu
*Assistant Examiner* — Michael Y Tzeng
(74) *Attorney, Agent, or Firm* — Buchanan Ingersoll & Rooney PC

(57) ABSTRACT

An image forming apparatus is disclosed, in which the index data of a document data is detected, and based on the particular index data, the contents of each index are displayed. Based on this display, an index is selected and the portion of the document data corresponding to the selected index is printed.

25 Claims, 15 Drawing Sheets

FIG.17

```
DOCUMENT ID:99999999
DOCUMENT NAME: REPORT

☐ INTRODUCTION
☐ LEGEND
☐ SUMMARY
■ FIRST CHAPTER
    ☐ FIRST SECTION
    ☐ SECOND SECTION
☐ SECOND CHAPTER
    ■ FIRST SECTION
        ☐ FIRST PARAGRAPH
        ☐ SECOND PARAGRAPH
    ☐ SECOND SECTION
        ■ FIRST PARAGRAPH
        ■ SECOND PARAGRAPH
        ☐ THIRD PARAGRAPH
    ☐ THIRD SECTION
        ☐ FIRST PARAGRAPH
        ☐ SECOND PARAGRAPH
☐ THIRD CHAPTER
    ☐ FIRST SECTION
        ☐ FIRST PARAGRAPH
        ☐ SECOND PARAGRAPH
    ☐ SECOND SECTION
☐ CONCLUSION
☐ REFERENCES
```

IMAGE FORMING APPARATUS FOR DETECTING INDEX DATA OF DOCUMENT DATA, AND CONTROL METHOD AND PROGRAM PRODUCT FOR THE SAME

This application is based on Japanese Patent Application No. 2006-114797 filed with the Japan Patent Office on Apr. 18, 2006, the entire content of which is hereby incorporated by reference.

BACKGROUND OF THE INVENTION

1. Field of the Invention

This invention relates to an image forming apparatus, or in particular to an image forming apparatus capable of printing document data by chapter, and a control method and a program product for the same.

2. Description of the Related Art

Various conventional techniques for handling document data have been disclosed.

Japanese Laid-Open Patent Publication No. 2003-162520, in particular, discloses a technique for managing document data by chapter. This reference further discloses a technique for printing the document data by chapter by manually inputting the chapter number of a document into a dialog box for print setting.

The conventional technique disclosed in this reference, though advantageous in that the printing range of the document data can be designated by chapter, sometimes causes an inconvenience on the part of the user in designation of the printing range. Specifically, the user in print designation is required to remember a particular chapter containing the desired portion of the document data to be printed. Otherwise, the user is required to display a thumbnail image of the document data and confirm a particular chapter containing the desired portion to designate the chapter to be printed. Especially, in the case where the document data is printed in an ordinary image forming apparatus such as MFP (multifunction peripherals) having mounted thereon a display unit small in screen size and low in resolution, a display unit having a comparatively high resolution is required to be mounted on the image forming apparatus for the sole purpose of displaying the thumbnail image. In other words, the image forming apparatus having the function to designate the printing range of the document data by chapter poses the problem of an increased product cost.

There thus exists a need to eliminate the inconvenience on the part of the user in designating the printing range without increasing the cost of the image forming apparatus for printing the document data.

SUMMARY OF THE INVENTION

This invention has been developed in view of the situation described above.

According to this invention, there is provided an image forming apparatus including a holder for holding document data, a printing unit for printing the document data held in the holder, a detector for detecting index data of the document data held in the holder, a display unit for displaying contents of each index of the document data based on the index data detected by the detector, and a selector for selecting the index with the contents thereof displayed on the display unit, wherein the printing unit prints a portion of the document data corresponding to the index selected by the selector.

According to this invention, there is provided a program product for controlling the image forming apparatus to execute the steps of holding document data, detecting the index data of the document data held, displaying the contents of each index of the document data based on the index data detected, selecting the index with the contents thereof displayed, and printing the portion of the document data held corresponding to the index selected.

According to this invention, there is provided a method of controlling the image forming apparatus, including the steps of holding document data, detecting index data of the document data held, displaying contents of each index of the document data based on the index data detected, selecting the index with the contents thereof displayed, and printing a portion of the document data held corresponding to the index selected.

According to this invention, the contents of the index data of the document data are displayed, and the user can designate the printing range of the document data by performing the operation of designating the index data from those of which the contents are displayed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a diagram showing an example of a marking sheet output by the MFP of the image forming apparatus according to the third embodiment of the invention.

DESCRIPTION OF THE PREFERRED EMBODIMENTS

First Embodiment

An image forming system including an image forming apparatus according to a first embodiment of the invention is explained below with reference to FIG. 1.

The image forming system is configured to carry out the data communication through a network (LAN (local area network), for example) 200. In this system, a lot of network devices are interconnected through network 200. The network devices include a MFP 1 and computers 201 to 203. MFP 1 makes up an image forming apparatus according to this embodiment. Computers 201 to 203 are configured of ordinary personal computers. In this invention, the number and the types of the network devices connected to network 200 are not limited to those shown in FIG. 1.

MFP 1 is a multipurpose image processing device functioning as an image reader, a facsimile, a printer and a duplicator at the same time. MFP 1 can print and output the image data and the document data input from an external image reader (not shown) or read from an original manuscript and accumulated in an internal storage unit on the one hand and can transmit the data to other devices through network 200 on the other hand.

Figure 2:
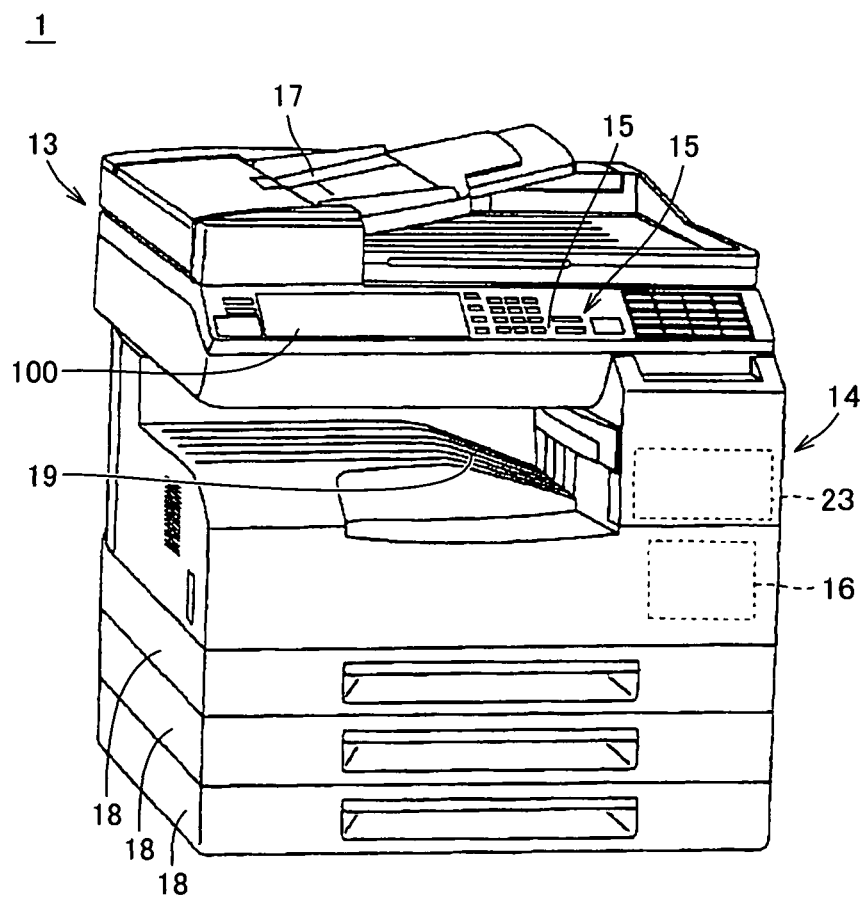
FIG. 2 is a diagram showing the appearance of a MFP in FIG. 1.

Referring to FIG. 2, MFP 1 includes a key operation unit 15 for receiving the input of the operating instructions for various processes and alphabetical and numerical data. Key operation unit 15 has a plurality of keys including a power key to be manipulated by the user.

MFP 1 also includes a display unit 100 for displaying the operation menu and the information on the images acquired. Display unit 100 is a touch panel display configured to display the operation menu, etc. and receive the operation of MFP 1 by detecting the contact operation on the image of the operating buttons displayed.

Also, MFP 1 includes a scanner 13 for producing an image data by reading an original manuscript photoelectrically, and a printer 14 for printing the image on a recording sheet based on the image data.

MFP 1 also includes, on the upper surface of the body thereof, a feeder for supplying the original manuscript to scanner 13, and under the body thereof, includes a paper feeder 18 for supplying a recording sheet to printer 14. MFP 1 further includes, at the central portion thereof, a tray 19 for discharging a recording sheet with the image printed by printer 14 thereon. MFP 1 furthermore includes therein a communication unit 16 for transmitting and receiving the data such as the image data to and from external devices through network 200 and a storage unit 23 for storing various data.

Scanner 13 acquires an image data by photoelectrically reading the image information such as a photo, a character or a picture from the original manuscript. The image data (concentration data) thus acquired, after being appropriately processed, is stored in a storage unit 23 and used as the data for a file attached to the electronic mail, or sent to printer 14 and/or communication unit 16 for printing an image or transmitting a data.

Printer 14 prints an image on the recording sheet based on the image data acquired by scanner 13 or the image data received from an external device by communication unit 16.

Communication unit 16 transmits and receives the facsimile data through the public telephone line on the one hand and transmits and receives the data through a network such as LAN or internet (including network 200) using an electronic mail system, etc. to and from the external devices connected to the network on the other hand. As a result, MFP 1 functions as an electronic mail transmitting/receiving terminal as well as a facsimile for normal facsimile communication. Therefore, various image data can be transmitted and received also as a file attached to the electronic mail. The network communication can be carried out by MFP 1 by wire or radio.

MFP 1 according to this embodiment can print the document data. The document data referred to herein includes the XML (eXtensible Markup Language) document, the PDF (Portable Document Format) document, and text sentences.

In printing the document data, MFP 1 can display the index of the particular document data. Specifically, in the case where the document data to be printed is of PDF format, the bookmark data contained in the document data is detected, and the title of the bookmark data is displayed on display unit 100. In the case where the document data to be printed is written in the markup language such as XML format or HTML (HyperText Markup Language), on the other hand, the header tag contained in the particular document data is detected and the contents of the particular header tag (for example, the text defined by <h1> and </h1> for the document data of HTML format) are displayed on display unit 100.

Figure 3:
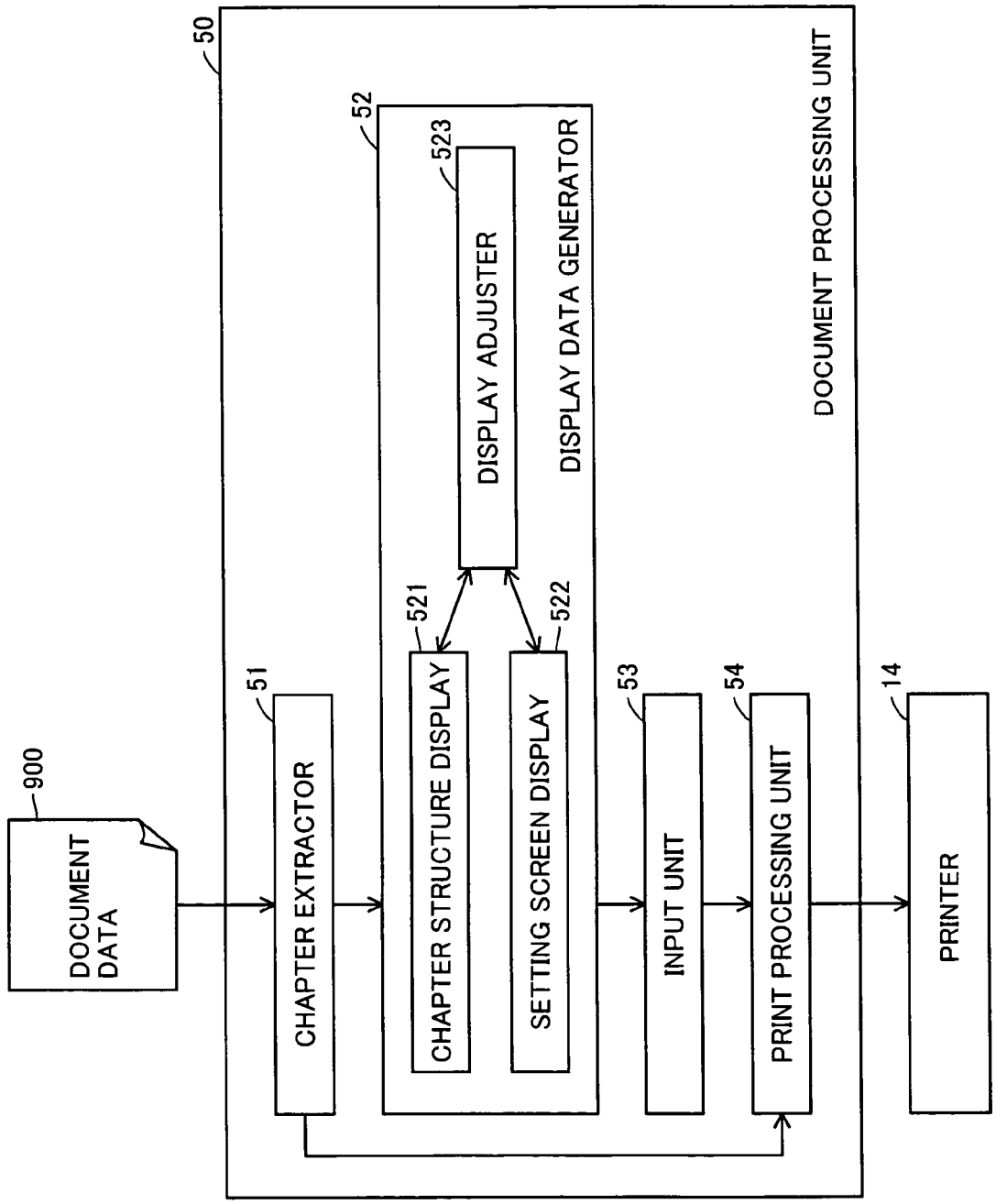
FIG. 3 is a control block diagram showing the feature portion of the MFP of FIG. 2 according to this invention.

FIG. 3 is a control block diagram showing the feature portion of MFP 1 according to this invention.

Referring to FIG. 3, MFP 1 includes a document processing unit 50 for processing document data 900 when processing to print document data 900. Document processing unit 50 sends printing data to printer 14 after appropriately processing document data 900. Document processing unit 50 is implemented upon execution of the proper program in MFP 1 by CPU 11 described later.

Document processing unit 50 includes a chapter extractor 51 for extracting the chapter structure of document data 900 using an application suitable for document data 900, a display data generator 52 for generating the display data using the chapter structure of document data 900 extracted by chapter extractor 51, an input unit 53 for receiving the printing information input by the operation of key operation unit 15 or the keys displayed on display unit 100, and a print processing unit 54 for transmitting printing data to printer 14 (or an external device).

Display data generator 52 includes a chapter structure display unit 521 for generating the data for displaying an index screen described later, a setting screen display unit 522 for displaying a print setting screen described later, and a display adjuster 523 for changing the contents of display of one of the index screen and the print setting screen in response to an input requiring the change of the display contents of the other.

Figure 4:
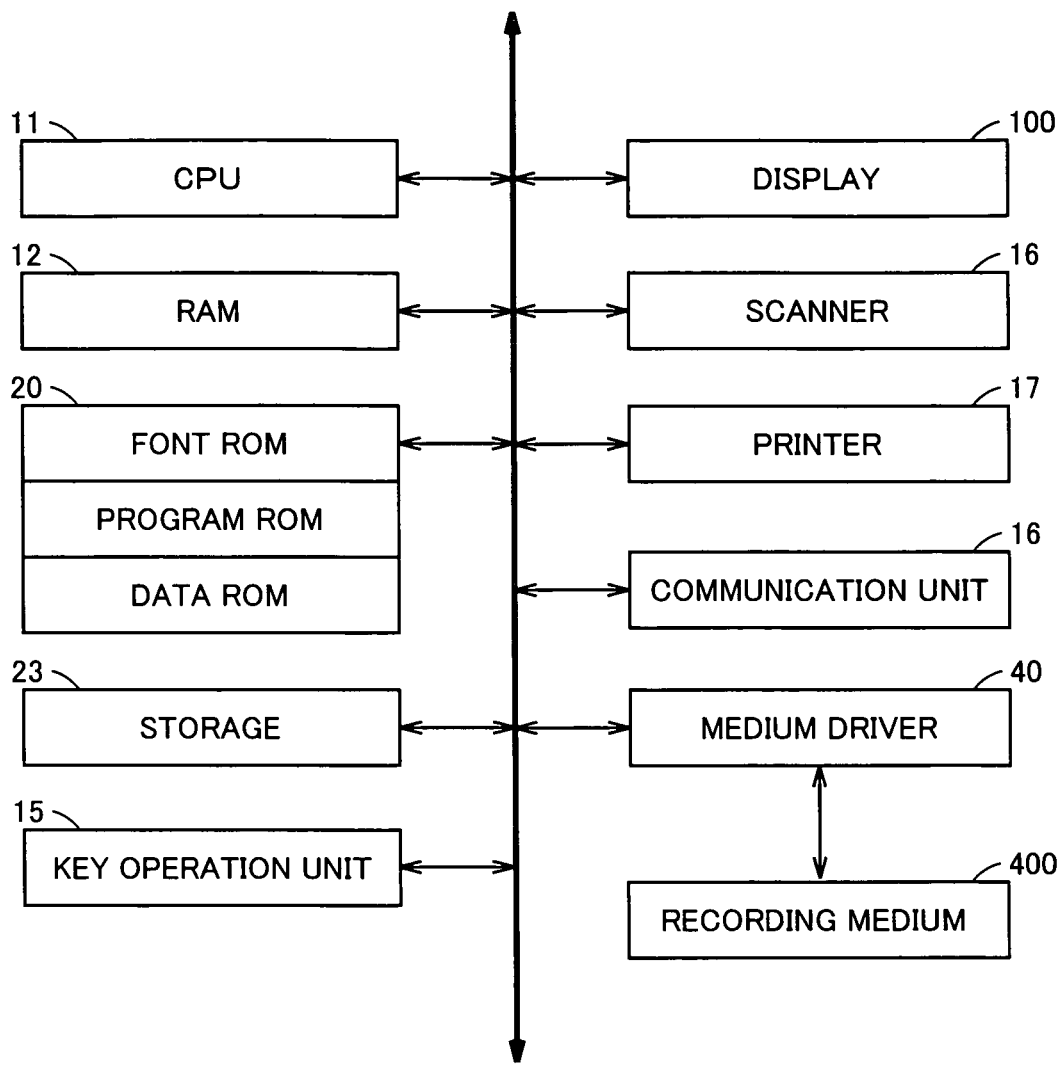
FIG. 4 is a hardware block diagram of the MFP shown in FIG. 2.

FIG. 4 is a hardware block diagram of MFP 1.

Referring to FIG. 4, MFP 1 includes, in addition to the component elements described above, a CPU 11, a RAM 12, a ROM 20 and a medium drive 40.

ROM 20 includes a font ROM for storing the font data, a program ROM for storing the program and a data ROM for storing the data such as a setting.

Medium drive 40 reads and writes information from and into a recording medium 400 mounted removably on MFP 1.

CPU 11, by executing the program stored in the program ROM of ROM 20 (or stored in recording medium 400), controls the operation of each component element of MFP 1 shown in FIG. 4, while at the same time realizing the process in the flowchart described later. RAM 12 functions as a main memory or a work area of CPU 11.

In MFP 1, a four-layer structure simulating a book of a paper medium is defined as a chapter structure of document data 900. The upper layer is called "document" simulating one document and defines the attribute of a particular document as a whole. The next layer (the second upper layer) corresponds to a chapter of a document and is called "chapter". The attribute of each chapter can also be defined. The second next layer (third upper layer) is called "section", and the attribute for each section can be defined. The lowest layer is called "paragraph", for each of which the attribute can be defined. A document can include a plurality of chapters. A chapter can include a plurality of sections, and a section can include a plurality of paragraphs.

Next, an example of a sentence structure in a document to be printed in MFP 1 is explained with reference to FIG. 5.

Figure 5:
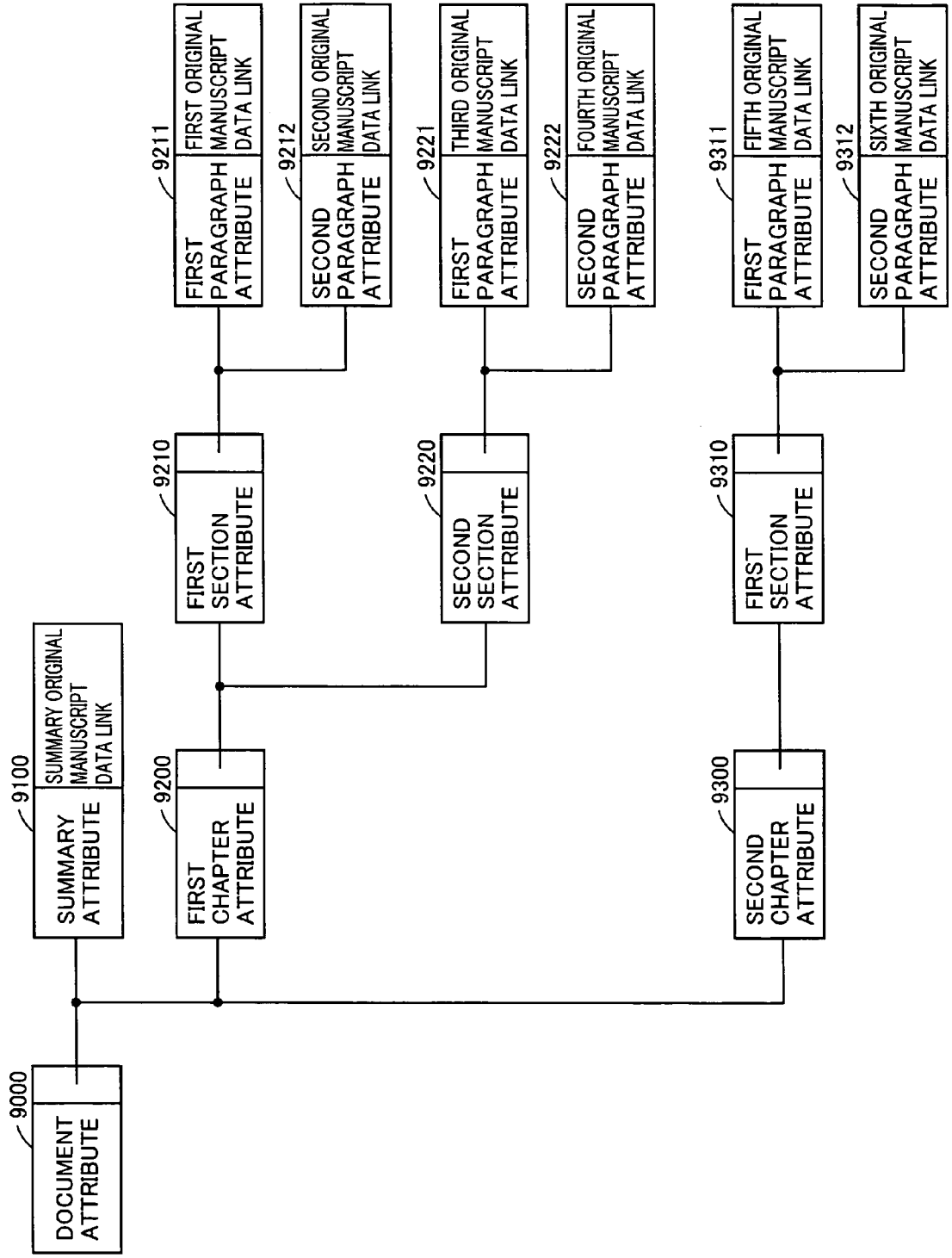
FIG. 5 is a diagram schematically showing an example of the sentence structure to be printed in the MFP of FIG. 1.

FIG. 5 shows a sentence structure using a plurality of nodes including the document, chapter, section and paragraph. The document, chapter, section and paragraph are each a concept for defining the sentence structure in a document, and therefore include a defined attribute value and a link to a lower layer as an entity. In addition to the attribute value, each paragraph includes a link to the entity of the document (original manuscript data (document data 900)).

Also, in the chapter structure of document data 900, an index called the "summary" is defined as the same node as "chapter", and the attribute of the index "summary" is defined in FIG. 5. The link to the document entity is stored also for the "summary" in addition to the attribute value.

Figure 6:
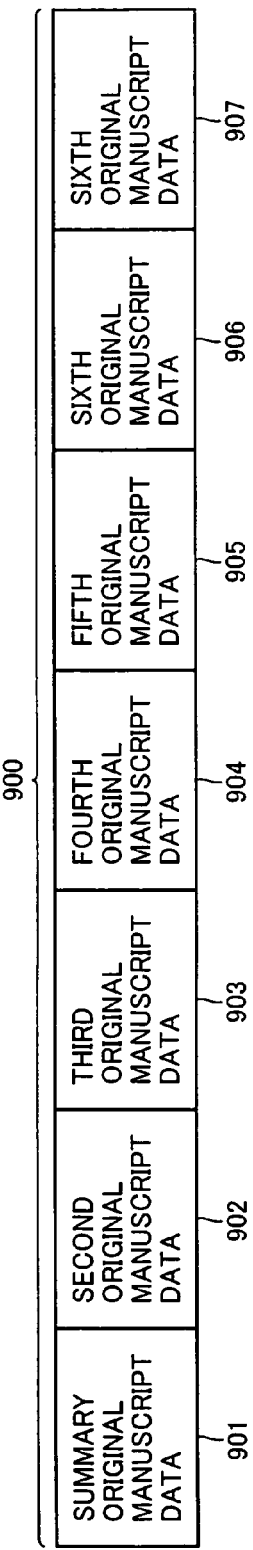
FIG. 6 is a diagram schematically showing the configuration of a document data to be printed in the MFP of FIG. 1.

Further, referring to FIG. 6, document data 900 defines the document attribute 9000 to which a summary attribute (summary attribute 9100) and two chapter attributes (first chapter attribute 9200 and second chapter attribute 9300) are linked. By this linkage, display unit 100 displays the fact that the two chapters are included in document data 900 as described later.

First chapter attribute 9200 is linked with two section attributes (first section attribute 9210 and second section attribute 9220). By this linkage, display unit 100 displays the fact that the two sections are included in the first chapter as described later.

First section attribute 9210 is linked with two paragraph attributes (first paragraph attribute 9211 and second paragraph attribute 9212). Also, second section attribute 9220 is linked with two paragraph attributes (first paragraph attribute 9221 and second paragraph attribute 9222). By this linkage, display unit 100 displays the fact that two paragraphs are included in each of the first and second sections of the first chapter as described later.

Second chapter attribute 9300 is linked with one section attribute (first section attribute 9310). Also, first section attribute 9310 is linked with two paragraph attributes (first paragraph attribute 9311 and second paragraph attribute 9312). By this linkage, display unit 100 displays the fact that one section is included in the second chapter and two paragraphs are included in the particular section (first section of the second chapter) as described later.

Each paragraph attribute (first paragraph attributes 9211, 9221, 9311 and second paragraph attributes 9212, 9222, 9312) includes a link to an original manuscript data (first to sixth original manuscript data links) described above.

FIG. 6 schematically shows a configuration of document data 900. In MFP 1, document data 900 to be printed may be the data stored in the data ROM of ROM 20 or recording medium 400 or the data received from an external device through network 200. The data transmitted from the external device is received by communication unit 16 and stored in RAM 12 of the data ROM of ROM 20. A plurality of boxes for arranging and classifying the stored data are defined in the data ROM.

Referring to FIG. 6, document data 900 includes first to sixth original manuscript data 901 to 906, each of which corresponds to the link to each original manuscript data (first to sixth original manuscript data links) shown in FIG. 5. Specifically, the first to sixth original manuscript data links shown in FIG. 5 are connected to first to sixth original manuscript data 901 to 906, respectively.

Next, the process executed by CPU 11 to print document data 900 stored in the data ROM of MFP 1 according to this embodiment is explained with reference to FIG. 7.

Figure 7:
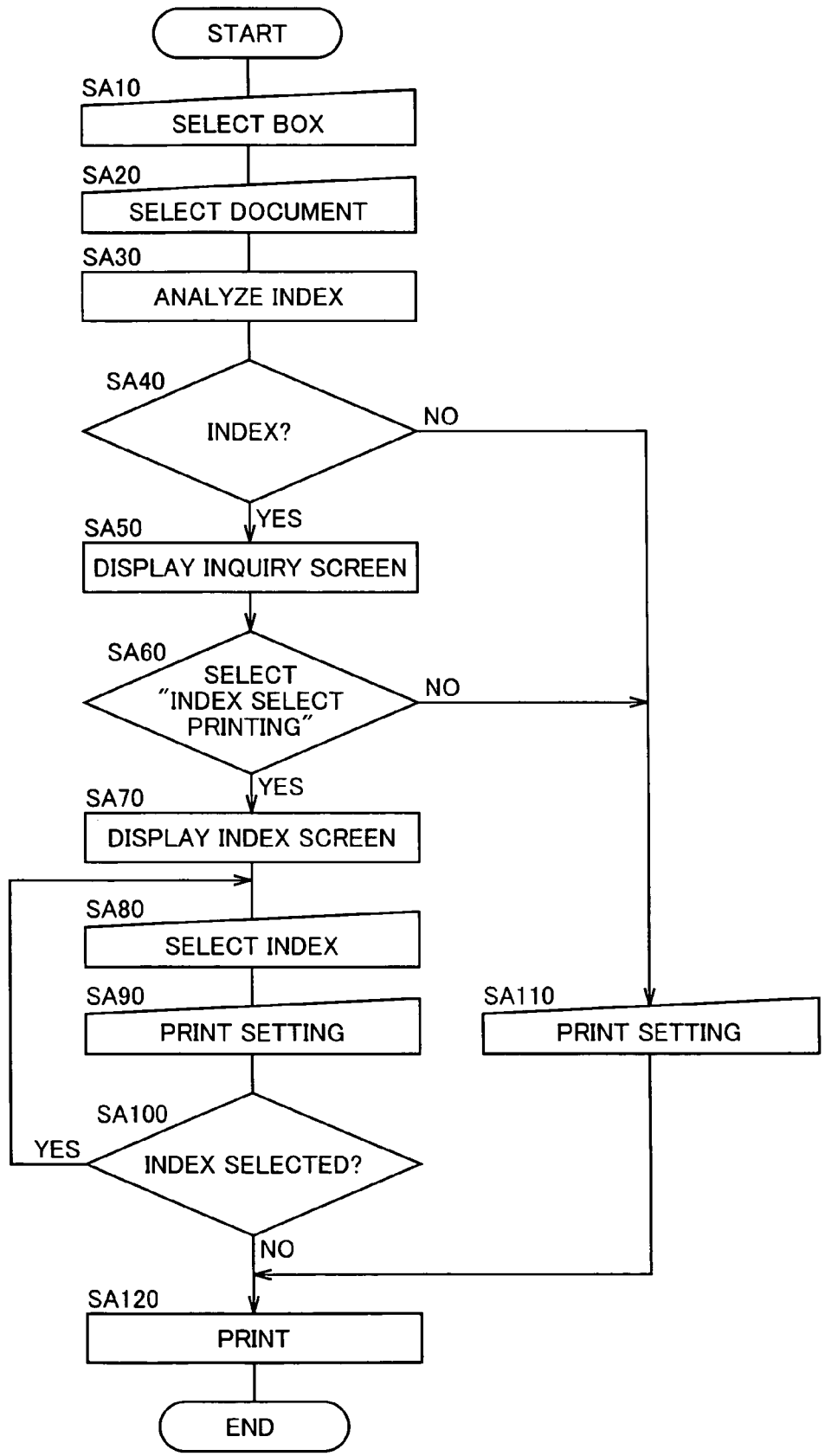
FIG. 7 is a flowchart of the process for printing the document data in the MFP shown in FIG. 1.

Referring to FIG. 7, CPU 11 first selects a box in the data ROM for acquiring the document to be printed in step SA10, and the document to be printed is selected in step SA10 from the document of which the data is stored in the box selected in step SA20, followed by proceeding to step SA30.

In CPU 11, the box and the document to be selected in steps SA10 and SA20 are determined based on the operation of the keys of key operation unit 15 or the touch keys displayed on display unit 100 or the information transmitted from other devices through network 200.

In step SA30, CPU 11 analyzes the index of document data 900 of the document selected in step SA20 and the process proceeds to step SA40. In step SA30, CPU 11 specifically searches for the index data in document data 900, and upon detection of the index data, analyzes the sentence structure using the particular index data. The index data is defined as the data for indicating an index of a document. In the case where the document to be printed is configured of the document data of PDF format, for example, the bookmark data included in the particular document data corresponds to the index data, while in the case where the document to be printed is the data of XML format or a markup language such as HTML, the header tag included in the particular document data and the contents thereof correspond to the index data.

In step SA40, CPU 11 determines whether the document data includes the index data or not, i.e. whether the index data can be detected or not at the time of index analysis in step SA30, and upon determination that the index data is so included, the process proceeds to step SA50. Otherwise, the process proceeds to step SA110.

In step SA50, CPU 11 displays a screen (inquiry screen) on display unit 100 for making an inquiry to the user as to whether the index select printing is carried out or not, and the process proceeds to step SA60. The index select printing is defined as a printing method in which the printing range of a document is selected by index (sentence index such as chapter, section or paragraph).

Figure 8:
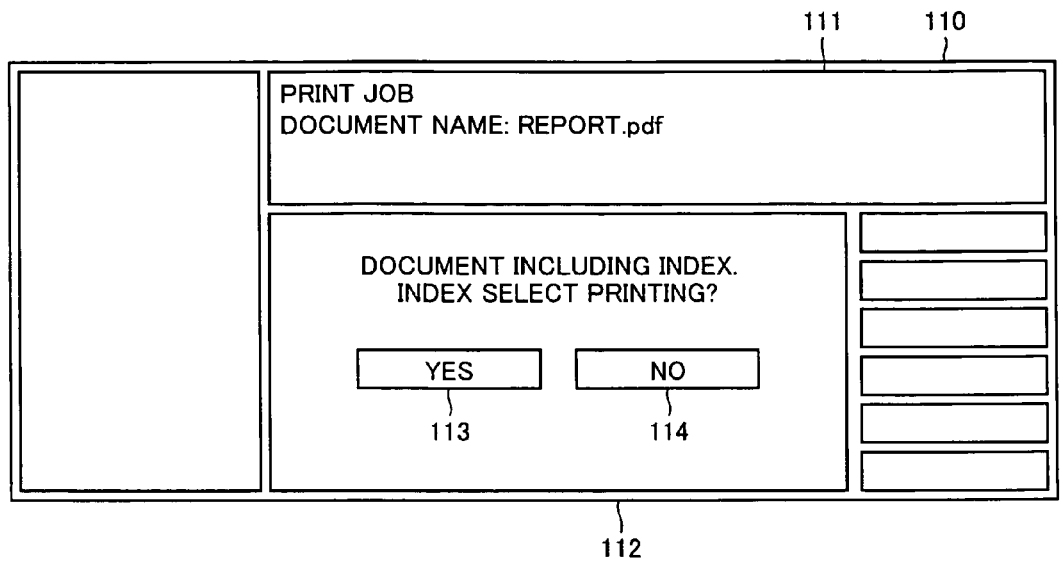
FIG. 8 is a diagram showing an example of the inquiry screen displayed on the display unit shown in FIG. 2.

An example of the inquiry screen is shown in FIG. 8. Referring to FIG. 8, inquiry screen 110 includes a display column 111 for displaying the information (file name, etc.) on the document to be printed and a display column 112 for displaying a message to the user. A message "An index is included (in the document to be printed). Is the index select printing carried out?" is on display in display column 112. Further, a touch key 113 corresponding to "Yes" and a touch key 114 corresponding to "No" are displayed. Once inquiry screen 110 is displayed, the user determines whether the index select printing is carried out or not by the operation of touch key 113 or 114.

Referring to FIG. 7 again, after the inquiry screen is displayed in step SA50, CPU 11 determines in step SA60 whether the user has selected the index select printing or not. Upon determination that the index select printing is selected (upon determination that touch key 113 is operated), the process proceeds to step SA70, while upon determination that no such selection is made (upon determination that touch key 114 is operated), the process proceeds to step SA110.

In step SA70, CPU 11 displays the index screen of document data 900 on display unit 100. The index screen is the one for indicating the sentence structure of document data 900, and CPU 11 generates the data for displaying the index screen based on the result of analysis of the index data of document data 900. An example of the index screen is shown in FIG. 9.

Figure 9:
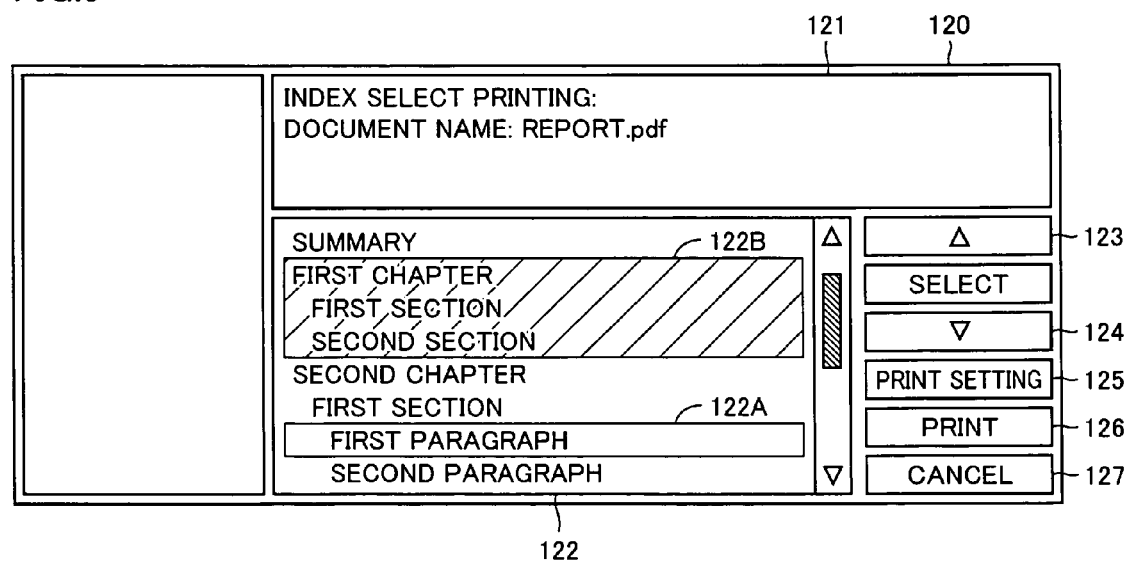
FIG. 9 is a diagram showing an example of the index screen displayed on the display unit of FIG. 2.

Referring to FIG. 9, index screen 120 includes a display column 121 for displaying the information on a document to be printed and the information indicating that the process for index select printing of the document is executed, a display column 122 for displaying the chapter structure of the document and touch keys 123 to 127.

A tree structure of the index (chapter, section, paragraph) included in the document is displayed in display column 122 as a chapter structure of the document to be printed.

In display column 122, area 122B displayed in reverse video indicates that the index in the particular area 122B is selected as a printing range. Also, a frame 122A is displayed. In the index screen 120, frame 122A is moved upward by operating touch key 123 and downward by operating touch key 124. Also, by operating touch key 125, the component elements existing in frame 122A for the time being are selected as a printing range. Incidentally, upon operation of touch key 125, MFP 1 executes the process of setting the printing of the index selected on index screen 120 (the component elements included in area 122B). Upon operation of touch key 126, on the other hand, MFP 1 executes the process in which the index selected on index screen 120 is printed in accordance with the default print setting registered. Also, upon operation of touch key 127, the index selection is canceled on the index screen 120.

Referring to FIG. 7 again, after displaying the index screen in step SA70, CPU 11 selects the index in step SA80, and after receiving the print setting for the index selected in step SA90, the process proceeds to step SA100.

The index is selected in step SA80 by displaying index screen 120 on display unit 100 and receiving the index selection from the user. In other words, CPU 11 selects the index based on the user operation in step SA80.

Figure 10:
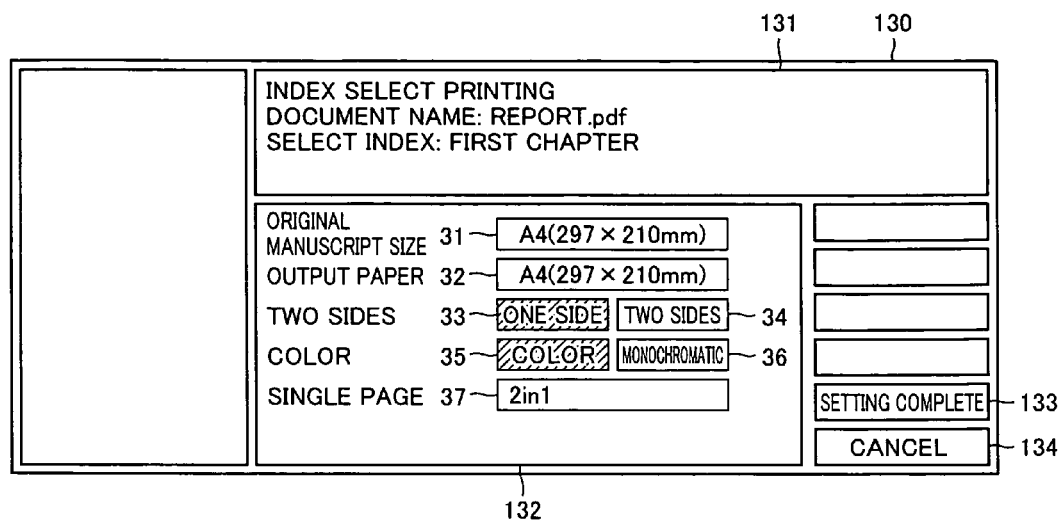
FIG. 10 is a diagram showing an example of the print setting screen displayed on the display unit of FIG. 2.

For print setting in step SA90, on the other hand, a print setting screen is displayed on display unit 100 as shown in FIG. 10 and the print setting is received from the user. Referring to FIG. 10, the name of the document to be set for printing and the index in the particular document is displayed in display column 131 of print setting screen 130. The index to be set for printing in the document is defined as an index selected in the immediately preceding step SA80. Also, input columns 31 to 37 for inputting the value of each item such as the original manuscript size are displayed in display column 132 of print setting screen 130. The user inputs a value into each of the input columns 31 to 37 by way of the keys of key operation unit 15, for example. Upon complete input, the user operates touch key 133. The user, if desirous of canceling the printing process, operates the touch key 134.

Figure 11:
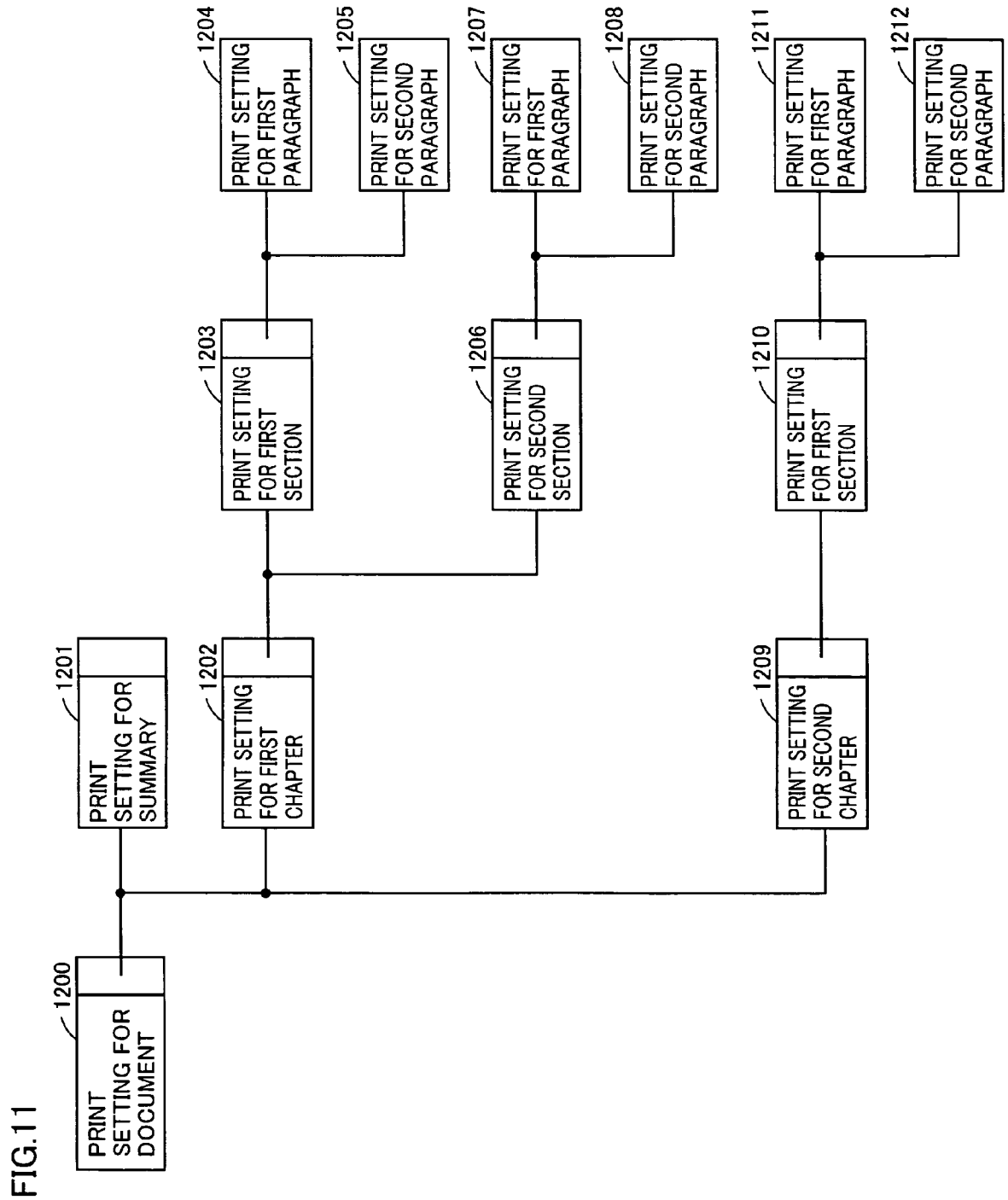
FIG. 11 is a diagram schematically showing the manner in which the print setting is stored in the RAM (random access memory) of FIG. 4.

The information (print setting) input on print setting screen 130 is stored in RAM 12 as information related to the index to be set as soon as touch key 133 is operated. FIG. 11 schematically shows the manner in which the print setting is stored in RAM 12.

Referring to FIG. 11, storage areas 1200 to 1212 corresponding to the indexes of document data 900 are defined in RAM 12 at the time of determination that the index select printing is selected in step SA60. The contents of print setting for the whole document are stored in storage area 1200. The contents of print setting for the index called the summary are stored in storage area 1201. The contents of print setting for the first and second chapters are stored in storage areas 1201, 1209, respectively. The contents of print setting for the first and second sections of the first chapter are stored in storage areas 1203, 1206, respectively. The contents of print setting for the first and second paragraphs of the first section of the first chapter are stored in storage areas 1204, 1205, respectively. The contents of print setting for the first and second paragraphs of the second section of the first chapter are stored in storage areas 1207, 1208, respectively. The contents of print setting for the first section of the second chapter are stored in storage area 1210. The contents of print setting for the first and second paragraphs of the first section of the second chapter are stored in storage areas 1211, 1212, respectively. In the "index select printing" according to this embodiment, the print setting is possible for the whole document or by chapter, by section or by paragraph. The contents of each print setting are stored in the corresponding ones of storage areas 1201 to 1212.

In step SA100, CPU 11 determines whether the information for selection to print other indexes is input or not, and upon determination that such information is input, the process is returned to step SA80. Upon determination that such information is not input (the information indicating the completion of the index selection is input, for example), on the other hand, the process proceeds to step SA120. Specifically, upon operation of touch key 133 after displaying print setting screen 130 in step SA90, CPU 11 displays index select screen 120 on display unit 100 and the process proceeds to step SA100. Then, upon operation of touch key 126 on index select screen 120, CPU 11 proceeds to step SA120, while upon operation of touch key 125, the process is returned to step SA80.

In step SA110, on the other hand, CPU 11 receives the input from the user for print setting of the document and the process proceeds to step SA120.

Figure 12:
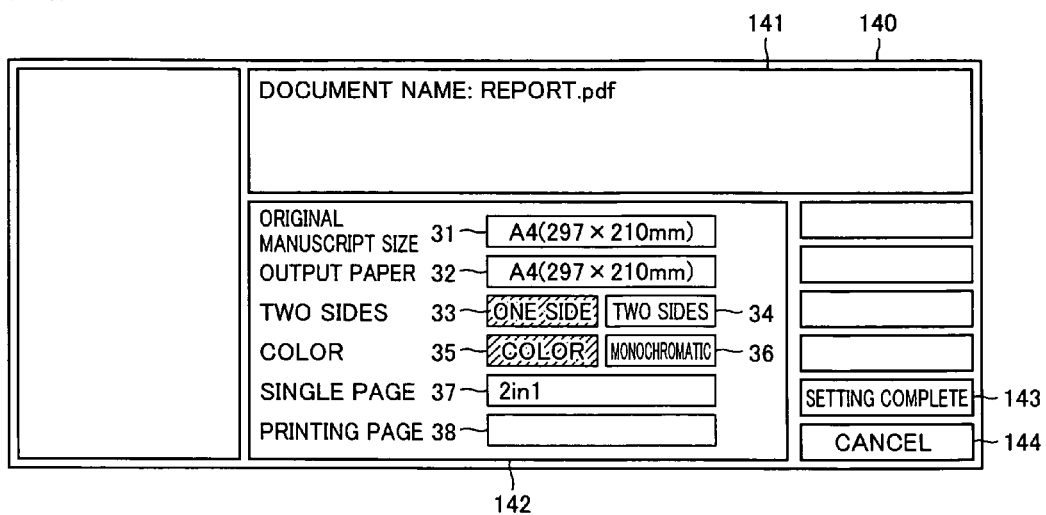
FIG. 12 is a diagram showing another example of the print setting screen displayed on the display unit of FIG. 2.

The contents of processing in step SA110 are explained with reference to FIG. 12. FIG. 12 is a diagram showing an example of the print setting screen displayed by CPU 11 on display unit 100 in step SA110.

The name of the document to be printed is displayed in display column 141 of print setting screen 140. Also, like display column 132 of print setting screen 130 shown in FIG. 10, display column 142 for displaying input columns 31 to 37 through which to input the value of each item is displayed on print setting screen 140. Incidentally, input column 38 for inputting the page to print the information on the document to be printed is displayed in display screen 142 in addition to input columns 31 to 37. The user, upon complete input of the information on the printing, operates touch key 143. In response to the operation of touch key 143, CPU 11 executes the process of steps SA110 to SA120. The print setting information input to print setting screen 140 is stored in RAM 12 as soon as touch key 143 is operated.

In step SA120, CPU 11, based on the information input to print setting screen 130 or print setting screen 140, causes printer 14 to execute the printing process of document data 900 and completes the process. Incidentally, CPU 11 prints document data 900 based on the print setting stored in RAM 12.

In the case where the index select printing is carried out with a plurality of different (contradictory) print settings stored for one index, CPU 11 executes the printing process giving priority to the print setting for the lowest layer.

Specifically, assume that the setting contents printed monochromatically are stored in storage area 1202 for storing the print setting of the first chapter, and that the setting contents printed in color are stored in storage area 1205 for storing the print setting of the second paragraph of the first section of the first chapter. In this case, two different setting contents are stored for the second paragraph of the first section of the first chapter. Then, CPU 11 prints the first paragraph of the first section of the first chapter and the first and second paragraphs of the second section of the first chapter in the manner (monochromatically) in accordance with the print setting for the first section, while the second paragraph of the first section of the first chapter is printed in the manner (color) corresponding to the print setting for the particular paragraph. The "paragraph" is a lower layer than the "chapter", and therefore the print setting for the paragraph is given priority over the print setting for the chapter.

According to the embodiment described above, MFP 1 detects the index data for document data 900 of a document to be printed, and upon detection, analyzes the sentence structure. Based on the analysis result, the contents of each index of the particular document are displayed. According to this embodiment, the item of document configuration such as "first chapter", "first section" and "first paragraph" are displayed in display column 122 of FIG. 9 as contents of the index. The contents of the index displayed according to this invention, however, are not limited to them. For example, either a character string stored between the tag ("h1", "h2", etc.) indicating the start of the index and the tag ("/h1", "/h2", etc.) indicating the end of the index in document data 900 or the title of the bookmark data in document data 900 may be displayed as contents of the index.

According to this embodiment, the user moves frame 122A on the screen displaying the contents of the index (index display screen 120) and further operates touch key 125. In this way, the user can designate the index to be printed based on the display of the contents of the index. CPU 11 of MFP 1 selects and actually prints the index designated by the user.

The user can designate a plurality of indexes for one printing process of one document. Also, different print settings are possible for a plurality of indexes. In MFP 1, the contents of print setting for each index are stored in RAM 12 as information related to each index as explained above with reference to FIG. 11.

In the case where the index data included in document data 900 indicates the leading position of each index, CPU 11 prints the data ranging from the leading position of the index to be printed to the leading position of the next index in the same layer as the index to be printed. Specifically, in the case where the index data is the one for specifying the leading position of each index and the first section of the first chapter is designated for printing, CPU 11 prints the data ranging from the leading position of the first section of the first chapter to the leading position of the second section of the first chapter. This is by reason of the fact that the second section of the first chapter corresponds to the next index of the layer called the "section" with respect to the first section of the first chapter.

Also, in the case where different print settings exist for one index, MFP 1 executes the printing process giving priority to the print setting for the index of a lower layer.

In the case where the data based on a plurality of print settings coexist in the data printed on one page, CPU 11 can output a different page for each different print setting.

Assume, for example, that the boundary between the first paragraph of the first section of the first chapter and the second paragraph of the first section of the first chapter is located in a given page and the print setting for the first paragraph and that for the second paragraph are different from each other. In such a case, CPU 11 can start the printing of the second paragraph from the page next to the given page without printing the leading position of the second paragraph in the given page. Specifically, in the case where the first paragraph is set to be printed in color and the second paragraph monochromatically, for example, the portion up to the last page of the first paragraph is printed in color, while the second paragraph is printed monochromatically from the next page.

Second Embodiment

An image forming apparatus according to a second embodiment of the invention has the same configuration as MFP 1 according to the first embodiment. MFP 1 according to this embodiment is different from MFP 1 according to the first embodiment in the contents of the process executed by CPU 11. Specifically, MFP 1 according to this embodiment can print the document data transmitted from an external device through network 200 (FIG. 1).

Next, the process executed by CPU 11 of MFP 1 according to this embodiment to print the document data transmitted from an external source is explained with reference to FIG. 13.

Figure 13:
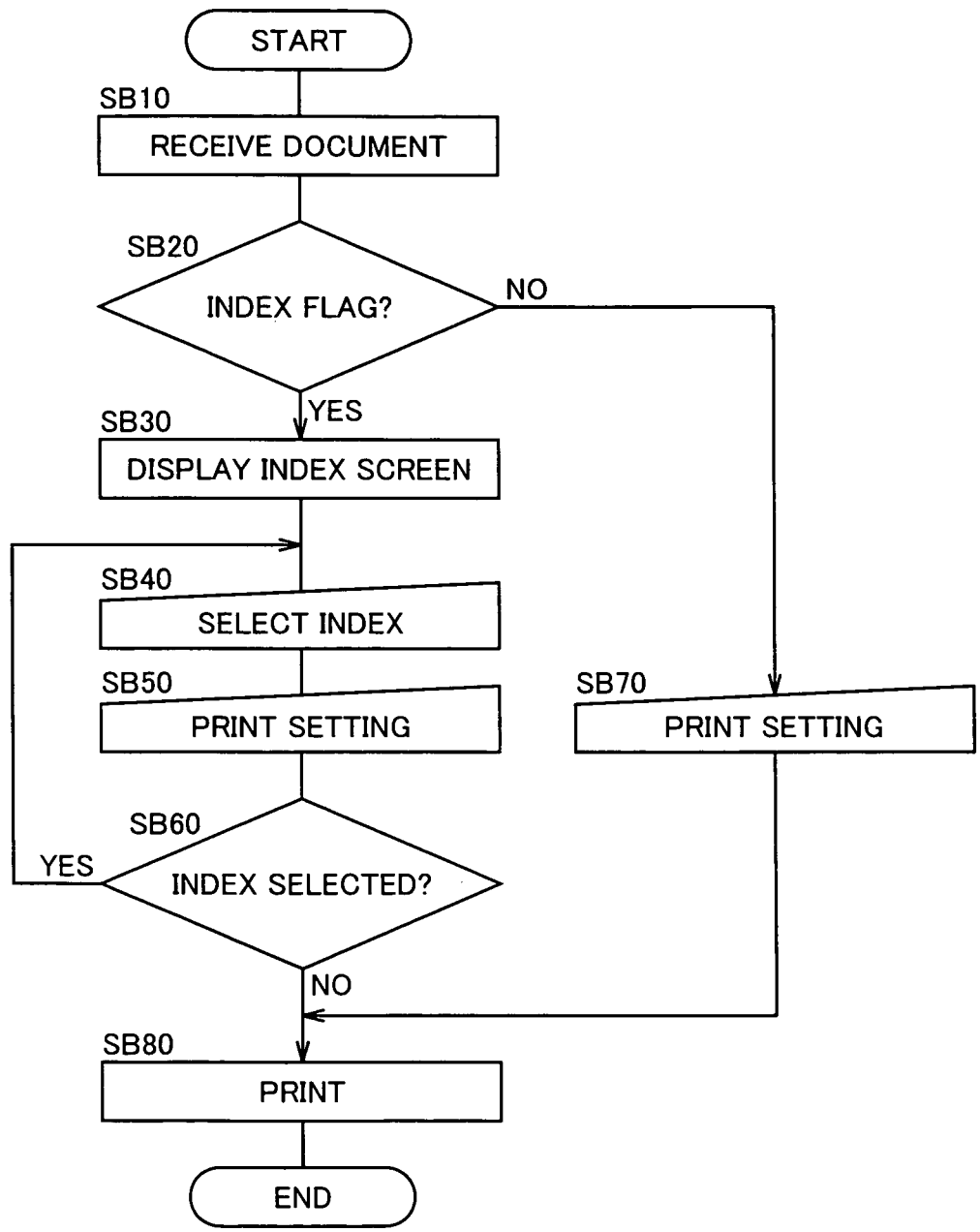
FIG. 13 is a flowchart of the process executed by the CPU (central processing unit) of the MFP of the image forming apparatus according to a second embodiment of the invention.

Referring to FIG. 13, CPU 11 causes communication unit 16 to receive and store the document data in storage unit 23 in step SB10, and the process proceeds to step SB20.

In step SB20, CPU 11 determines whether the document data received in step SB10 includes an index flag or not, and upon determination that the index flag is so included, the process proceeds to step SB30. Otherwise, the process proceeds to step SB70.

The index flag is defined as a flag indicating the presence of an index data in the document data, and the user of computer 201 determines whether the flag is to be added to the document data before MFP 1 receives the document data.

In step SB30, CPU 11 displays the index screen of the received document data on display unit 100, and the process proceeds to step SB40.

Figure 14:
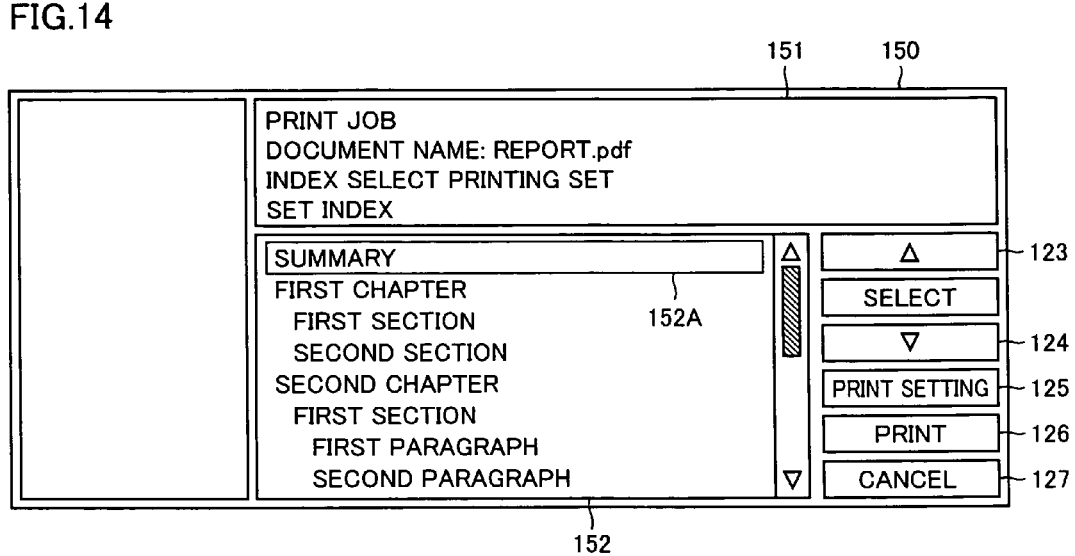
FIG. 14 is a diagram showing an example of the index screen displayed on the display unit of the MFP of the image forming apparatus according to the second embodiment of the invention.

In step SB30, the index screen is displayed by a similar process to step SA70 (FIG. 7). Specifically, CPU 11 analyzes the document structure based on the index data included in the document data received in step SB10, and displays the analysis result in a tree structure, for example, on display unit 100. FIG. 14 shows an example of the index screen displayed in step SB30.

Referring to FIG. 14, a display column 151 for displaying the name of the document to be printed and a message for prompting the user to select the index to be printed is displayed on index screen 150. Further, a display column 152 for displaying the index of the document to be printed in a tree structure and touch keys 123 to 127 for selecting the index to be printed from the indexes displayed in display column 152 are also displayed on index screen 150. A frame 152A for designating index to be printed is displayed in display column 152. Touch keys 123 to 127 are similar to the corresponding ones shown in FIG. 9.

Referring to FIG. 13 again, CPU 11, after displaying the index screen in step SB30, selects the index in step SB40, and after receiving the print setting for the selected index in step SB50, the process proceeds to step SB60.

In step SB60, CPU 11 determines whether the information for selecting another index to be printed is input from the user or not, and upon determination that such information is input, the process is returned to step SB40. Otherwise (for example, upon determination that the information indicating the completion of index selection is input), the process proceeds to step SB80.

The contents of the process in steps SB40 to SB60 are similar to those in steps SA80 to SA100 explained above with reference to FIG. 7 and therefore not explained in detail again.

In step SB70, on the other hand, CPU 11 receives the input from the user for print setting of the document and the process proceeds to step SB80.

The contents of the process in step SB70 are similar to those in step SA110 explained above with reference to FIG. 7 and therefore not explained in detail again.

In step SB80, CPU 11 causes printer 14 to print document data 900 based on the contents set in step SB50 or SB70 and completes the process.

Figure 1:
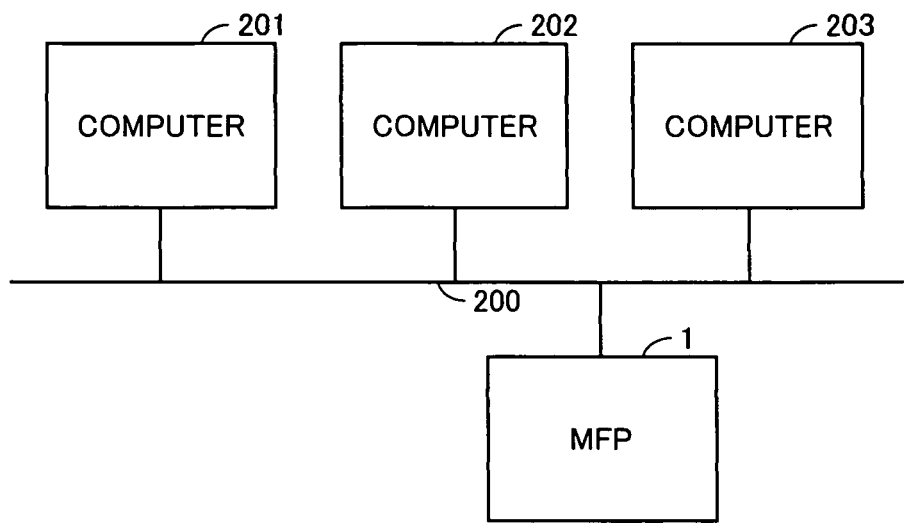
FIG. 1 is a diagram schematically showing a configuration of an image forming system including an image forming apparatus according to a first embodiment of the invention.

According to the embodiment described, communication unit 16 (FIG. 4) of MFP 1 receives the document data through network 200 (FIG. 1). In the case where the document data received by MFP 1 includes an index flag, the particular document data is printed by MFP 1 after the index to be printed is designated.

Figure 15:
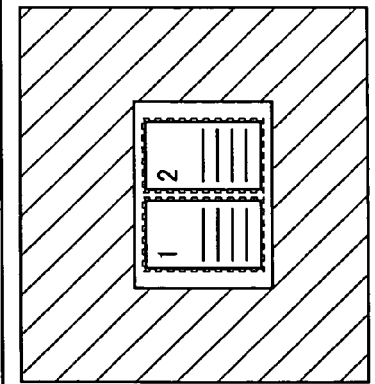
FIG. 15 is a diagram showing an example of the screen displayed on a monitor of a computer for transmitting the document data to the MFP of the image forming apparatus according to the second embodiment of the invention.

To attach the index flag to the document data, the operation for attaching the index flag is performed by a device at the transmitting end of the particular document data. In the case where the document data is transmitted from computer 201 to MFP 1, for example, the operation for attaching the index flag is performed at the time of editing the document data in computer 201. Specifically, at the time of editing in computer 201, the screen shown in FIG. 15 is displayed on the monitor of computer 201. Referring to FIG. 15, screen 210 displays the contents of setting for the paper to print the document data, together with a check column 211 for designating the printing by the index select printing (refer to the explanation of the first embodiment) in MFP 1. With check column 211 marked with a check, a predetermined flag (the index flag described above) is attached by computer 201 to the document data edited. In the case where this print setting is performed by computer 201, the process of receiving the print setting input from the user in step SB70 of FIG. 13 may be omitted.

As explained above, according to this embodiment, MFP 1 determines whether the index select printing is carried out or not, based on the information designated at the time of editing the document data in an external device. As a result, MFP 1 can carry out the printing operation in the form reflecting the intention of the user who has edited the document data.

The present embodiment described above refers to a case in which an index flag is used for the determination in step SB20. As an alternative, the process may be executed without using the index flag. Specifically, MFP 1 determines, as in the first embodiment, whether the document received contains the index data like in step SA40, and upon determination that the index data is contained, the process proceeds to step SB30. Otherwise, the process proceeds to step SB70.

The printing of the document data received by MFP 1 according to this embodiment includes a case in which the electronic mail transmitted to MFP 1 is printed or a case in which the direct printing (a method in which the PDF data is transmitted to and interpreted and printed by MFP 1 by rasterization) is carried out. In such a case, the electronic mail or the PDF data received may be configured to attach the index flag so that MFP 1 may determine whether the index flag is attached to them or not, or as in the first embodiment, MFP 1 may determine whether the electronic mail or the PDF data, as the case may be, includes the index data or not.

Third Embodiment

The image forming apparatus according to a third embodiment of the invention has the same configuration as MFP 1 according to the first embodiment. MFP 1 according to this embodiment, as compared with MFP 1 according to the first embodiment, has different contents of the process executed by CPU 11. Specifically, MFP 1 according to this embodiment outputs the paper for designating the index to be printed in the case where the document data to be printed includes the index data.

Next, the process executed by CPU 11 in the case where the document data is printed in MFP 1 according to this embodiment is explained with reference to FIG. 16.

Figure 16:
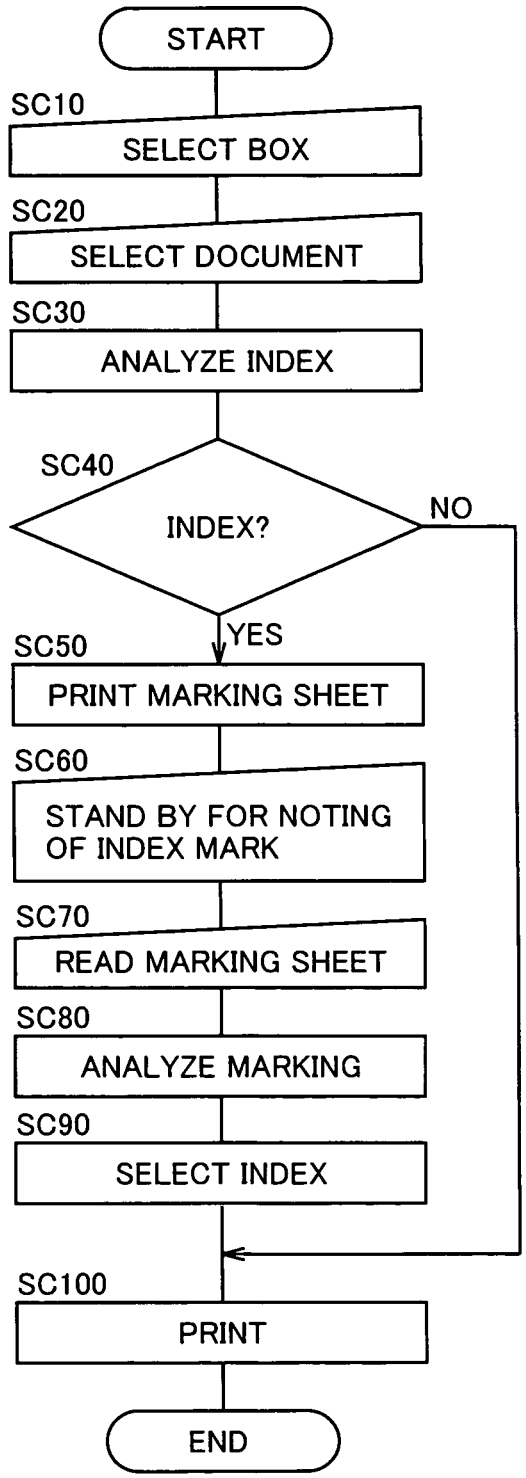
FIG. 16 is a flowchart of the process executed by the CPU of the MFP of the image forming apparatus according to a third embodiment of the invention.

Referring to FIG. 16, CPU 11 first selects a box in the data ROM to acquire the document to be printed in step SC10, and selects the document to be printed in step SC10 from the documents in the data stored in the box selected in step SC20, after which the process proceeds to step SC30.

CPU 11 determines the box and the document selected in steps SC10 and SC20 based on the operation of the keys of key operation unit 15 or the touch keys displayed on display unit 100 or based on the information transmitted from another device through network 200.

In step SC30, CPU 11 analyzes the index of document data 900 of the document selected in step SC20 and the process proceeds to step SC40. In step SC30, CPU 11 specifically searches document data 900 for the index data and upon detection of the index data, analyzes the sentence structure using the particular index data.

In step SC40, CPU 11 determines whether the document data includes the index data or not, i.e. whether the index data can be detected at the time of analysis of the index in step SC30, and upon determination that the index data is so included, the process proceeds to step SC50. Otherwise, the process proceeds to step SC100.

In step SC50, CPU 11 prints the marking sheet of document data 900 to be printed. The marking sheet is defined as the sentence structure of document data 900 expressed schematically to allow the user to designate the desired index to be printed on the paper thereof. FIG. 17 shows an example of the marking sheet.

Referring to FIG. 17, the document ID and the document name (the file name of document data 900) are printed in the upper part of marking sheet 60, and further the names of the index of document data 900 such as "introduction", "legend", "summary", "first chapter", "first section", etc. are printed. A check box (index mark) is printed on the left side of each index name on marking sheet 60. The user designates the particular index for printing by solidly filling (noting the index mark) in the check box on the left side of each index name of marking sheet 60. Then, the user performs the operation of causing MFP 1 to scan marking sheet 60 solidly filled in the check box corresponding to the index to be printed.

Referring to FIG. 16 again, CPU 11, after printing the marking sheet in step SC50, stands by until the user performs the scanning operation in step SC60.

Once such an operation is performed by the user, CPU 11 causes scanner 16 to scan marking sheet 60 in step SC70, and the process proceeds to step SC80. In step SC80, CPU 11 analyzes the image data obtained by scanning in step SC70, and extracts the index solidly filled in the corresponding check box on the marking sheet, after which the process proceeds to step SC90.

In step SC90, CPU 11 selects the index to be printed in document data 900 from the indexes extracted in step SC80, and the process proceeds to step SC100. In step SC90, CPU 11 causes RAM 12 to store a particular index selected for printing.

In step SC100, CPU 11 causes printer 14 to print document data 900 thereby to complete the process. In the case where the information on the data to be printed is stored in RAM 12, CPU 11 causes only the index corresponding to the particular information to be printed.

The embodiments described above can be carried out in any possible combination as required as far as possible. Specifically, the technical contents described in the first to third embodiments in this specification, i.e. "the printing of the document data stored in the MFP", "the printing of the document data transmitted through the network" and "the determination of the index to be printed by the MFP reading the image of the paper describing the information to designate the index", can be realized also by carrying out the corresponding mode in a single image forming apparatus.

Since certain changes may be made in the above apparatus and system without departing from the scope of the invention herein involved, it is intended that all matter contained in the above description or shown in the accompanying drawings shall be interpreted as illustrative and not in a limiting sense.

As a result, the printing range can be designated by the range such as the chapter having the index data in the document data. Also, the user can confirm a particular index data corresponding to the desired portion by checking the displayed contents of the index data. Therefore, the display unit of the image forming apparatus can have a resolution only sufficient to confirm the contents of the index data but not necessarily a resolution required to display the thumbnail image.

According to this invention, therefore, the inconvenience which otherwise might be felt by the user in designating the printing range at the time of printing the document data can be avoided without increasing the cost of the image forming apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
    a holder for holding document data;
    a printing unit for printing the document data held in the holder;
    a detector for detecting index data of one document data held in the holder;
    a display unit for displaying contents of each index of the document data based on the index data detected by said detector;
    a selector for selecting at least one index displayed on said display unit; and
    a designating unit for designating print settings for each one of the selected indexes included in one document data,
    wherein said printing unit prints a portion of the document data corresponding to an index selected by the selector, wherein when a plurality of different designated print settings coexist in the document data to be printed on one page, the printing unit is configured to print the document data so that one portion of the document data for one index corresponding to one of the different designated print settings and another portion of the document data for another index corresponding to another one of the different designated print settings are separately printed into different pages without a user designating the portions to be separately printed into the different pages.

2. The image forming apparatus according to claim 1, wherein
    said printing unit prints the document data on condition that the at least one index is selected by said selector in the case where said detector detects the index data from the document data held in the holder.

3. The image forming apparatus according to claim 2, further comprising:
    a receiver for receiving the document data through a network, wherein
    said printing unit prints the document data on condition that the at least one index is selected by said selector in the case where the document data held in the holder is input through the receiver, and
    said detector determines that the index data is included in the document data in the case where a predetermined flag is attached to the document data input through said receiver.

4. The image forming apparatus according to claim 1, wherein
    said detector detects a bookmark data included in the document data in the case where the document data is in a portable document format.

5. The image forming apparatus according to claim 4, wherein
    said display unit displays a title of the bookmark data included in the document data as the contents of the index.

6. The image forming apparatus according to claim 1, wherein
    said detector detects a header tag included in a document data in the case where the document data is selected one of an extensible markup language format and a hypertext markup language.

7. The image forming apparatus according to claim 6, wherein
    said display unit displays the contents of the header tag included in the document data as the contents of the index.

8. The image forming apparatus according to claim 1, wherein
    said selector selects a plurality of indexes from the indexes with the contents thereof displayed in said display unit, and
    said printing unit receives a print setting for each index selected by said selector.

9. The image forming apparatus according to claim 1, wherein
    said detector analyzes the sentence structure of the document data based on the index data of the document data held in said holder, and
    wherein the sentence structure has layer structure and said display unit displays the contents of the index in a tree structure based on the sentence structure.

10. The image forming apparatus according to claim 9, wherein
    said printing unit prints the document data held in the holder from a starting point of a main body corresponding to the index selected by said selector to a starting point of the main body corresponding to the next index in the same layer as the selected index.

11. The image forming apparatus according to claim 10, wherein
said printing unit receives the print setting for each index selected by said selector, and in the presence of a plurality of print settings for the same index of the document data, the data is printed giving priority to the print setting for the lower layer.

12. The image forming apparatus according to claim 1, further comprising:
an output unit for outputting by printing on the paper the contents of the index detected by said detector, in a manner capable of designating the index; and
an input unit for receiving the image input, wherein
said selector extracts the index designated for the paper output from the output unit based on the image received by the input unit and selects the extracted index.

13. The image forming apparatus according to claim 1, wherein
the plurality of designated print settings for the at least one selected index from a plurality of indexes are stored in a memory, and the printing unit prints the document data on different pages based on the plurality of designated print settings stored in the memory.

14. The image forming apparatus according to claim 1, wherein
if the plurality of different designated print settings is detected to coexist in one page of the document data for a plurality of selected indexes, the printing unit prints the document data on different pages for each designated print setting.

15. A non-transitory computer-readable storage medium, with instructions stored thereon, which when executed by a processor of an image forming apparatus, cause the apparatus to:
hold document data;
detect index data of one document data held;
display contents of each index of the document data based on the index data detected;
select at least one index displayed;
designate print settings for each one of the selected indexes included in one document data; and
print a portion of the document data held corresponding to a selected index, wherein when a plurality of different designated print settings coexist in the document data to be printed on one page, one portion of the document data for one index corresponding to one of the different designated print settings and another portion of the document data for another index corresponding to another one of the different designated print settings are separately printed into different pages without a user designating the portions to be separately printed into the different pages.

16. The computer-readable storage medium of claim 15, wherein the plurality of designated print settings for each selected index from a plurality of indexes are stored in a memory, and the printing of the document data on different pages is based on the plurality of designated print settings stored in the memory.

17. The non-transitory computer-readable storage medium according to claim 15, wherein
if the plurality of different designated print settings is detected to coexist in one page of the document data including the plurality of selected indexes, the instructions cause the apparatus to print the document data on different pages for each designated print setting.

18. A method of controlling the image forming apparatus, comprising the steps of holding document data;
detecting index data of one document data held;
displaying contents of each index of the document data based on the index data detected;
selecting at least one index data displayed;
designating print settings for each one of the selected indexes included in one document data; and
printing a portion of the document data held corresponding to a selected index, wherein when a plurality of different designated print settings coexist in the document data to be printed on one page, one portion of the document data for one index corresponding to one of the different designated print settings and another portion of the document data for another index corresponding to another one of the different designated print settings are separately printed into different pages without a user designating the portions to be separately printed into the different pages.

19. The method of controlling the image forming apparatus according to claim 18, wherein
said printing step includes the step of printing the document data on condition that the at least one index is selected in the case where the index data is detected from the document data held.

20. The method of controlling the image forming apparatus according to claim 18, wherein
said detection step includes the step of detecting the bookmark data included in the document data in the case where the document data is in a portable document format.

21. The method of controlling the image forming apparatus according to claim 18, wherein
said detection step includes the step of detecting a header index tag included in the document data in the case where the document data is selected one of an extensible markup language format data and a hypertext markup language document data.

22. The method of controlling the image forming apparatus according to claim 18, wherein
said select step includes the step of selecting a plurality of indexes from the indexes with the contents thereof displayed in the display step, and
said printing step includes the step of receiving the print setting for each selected index.

23. The method of controlling the image forming apparatus according to claim 18, wherein
said detection step includes the step of analyzing the sentence structure of the document data based on the index data of the document data held, and
said display step includes the step of displaying the contents of the index in a tree structure based on the sentence structure analyzed.

24. The method of controlling the image forming apparatus according to claim 18, wherein the plurality of designated print settings for each selected index from a plurality of indexes are stored in a memory, and the document data is printed on different pages based on the plurality of designated print settings stored in the memory.

25. The method of controlling the image forming apparatus according to claim 18, wherein
if the plurality of different designated print settings is detected to coexist in one page of the document data including the plurality of selected indexes, printing the document data on different pages for each designated print setting.

* * * * *